United States Patent
Mukhopadhyay et al.

(10) Patent No.: US 9,361,271 B2
(45) Date of Patent: Jun. 7, 2016

(54) SYSTEMS AND METHODS TO ENABLE ECO-DRIVING

(71) Applicants: Jaydip Mukhopadhyay, West Bengal (IN); Sudipta Ghosh, Kolkata (IN); Prakash Rao Kulkarni, Andhra Pradesh (IN)

(72) Inventors: Jaydip Mukhopadhyay, West Bengal (IN); Sudipta Ghosh, Kolkata (IN); Prakash Rao Kulkarni, Andhra Pradesh (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 13/850,954

(22) Filed: Mar. 26, 2013

(65) Prior Publication Data

US 2013/0218427 A1 Aug. 22, 2013

(30) Foreign Application Priority Data

Mar. 27, 2012 (IN) .......................... 3361/CHE/2011

(51) Int. Cl.
| G06F 19/00 | (2011.01) |
|---|---|
| G06G 7/70 | (2006.01) |
| G06G 7/76 | (2006.01) |
| G06F 17/00 | (2006.01) |
| B60W 40/09 | (2012.01) |
| B60R 16/03 | (2006.01) |

(52) U.S. Cl.
CPC ................ *G06F 17/00* (2013.01); *B60R 16/03* (2013.01); *B60W 40/09* (2013.01); *B60W 2530/145* (2013.01); *B60W 2530/20* (2013.01); *B60W 2540/28* (2013.01)

(58) Field of Classification Search
CPC ..... B60W 40/00; B60W 40/02; B60W 40/04; B60W 40/06; B60W 40/12
USPC .......................................... 701/123; 340/439
See application file for complete search history.

(56) References Cited

U.S. PATENT DOCUMENTS

| 5,366,376 A | 11/1994 | Copperman et al. |
|---|---|---|
| 2004/0093264 A1 | 5/2004 | Shimizu |
| 2009/0143934 A1* | 6/2009 | Motonaga ............. B60W 50/14 701/31.4 |
| 2010/0010732 A1* | 1/2010 | Hartman ............. G01C 21/3484 701/532 |
| 2010/0030458 A1* | 2/2010 | Coughlin ............. B60W 40/09 701/123 |
| 2010/0324817 A1* | 12/2010 | Hansen ............. G01C 21/3415 701/414 |
| 2011/0148614 A1* | 6/2011 | Wagner ............. B60W 40/09 340/439 |
| 2011/0238457 A1* | 9/2011 | Mason ............. G01C 21/3469 705/7.14 |

(Continued)

FOREIGN PATENT DOCUMENTS

| EP | 1811481 | 7/2007 |
|---|---|---|
| WO | WO 2011/033840 | 3/2011 |

OTHER PUBLICATIONS

Boriboonsomsin et al., "Co Eco-Driving: Pilot Evaluation of Driving Behavior Changes among U.S. Drivers," UCTC-FR-2010-20 (2010).

(Continued)

*Primary Examiner* — Imran Mustafa
(74) *Attorney, Agent, or Firm* — Finnegan, Henderson, Farabow, Garrett & Dunner, L.L.P.

(57) ABSTRACT

Systems and methods for enabling eco-driving are herein provided. Systems and methods in accordance with the present disclosure allow for real-time monitoring of greenhouse gas emissions and other variables that influence the environmental friendliness of vehicle operation. Systems and methods in accordance with the present disclosure also provide analytical tools for quantifying the environmental friendliness of vehicle operation and driving patterns.

9 Claims, 4 Drawing Sheets

(56) References Cited

U.S. PATENT DOCUMENTS

2011/0241865 A1* 10/2011 Saito .................... B60W 50/14
340/439
2011/0281564 A1* 11/2011 Armitage ............... G07C 5/085
455/414.1

OTHER PUBLICATIONS

Kompfner et al., "ICT for Clean & Efficient Mobility Final Report," Safety Support (2008).

Ochieng et al., "The Development and Demonstration of a Real Time Vehicle Performance and Emissions Monitoring System," 82nd Annual Meeting of the Transportation Research Board (2002).

Reinhardt et al., "D 4.4 Roadmap on ICT for energy efficiency and recommendations for sustainable networking," iCars Network (2010).

Satou et al., "Development of the on-board eco-driving support system," ISJAEE, vol. 9, No. 89, pp. 35-40 (2010).

S. Ubede et al., Green Logistics at Eroski: A case study, Int. J. Production Economics 131, pp. 44-51 (2011).

* cited by examiner

SYSTEMS AND METHODS TO ENABLE ECO-DRIVING

RELATED APPLICATIONS

This application claims priority under 35 U.S.C. §119 to Indian Provisional Patent Application 3361/CHE/2011, filed Mar. 27, 2012. The aforementioned application is incorporated herein by reference in its entirety.

TECHNICAL FIELD

The present disclosure generally relates to implementations of eco-driving, and, more particularly, relates to emissions reduction, total cost of vehicle ownership assessment, and green-vehicle development.

BACKGROUND

According to a U.N. report on global fuel efficiency and motor vehicle emission standards, major countries and regions such as India, China, Brazil, Korea, Japan, Europe, Canada and the U.S. have announced, or are about to announce, major overhauls in their vehicle fuel economy regulations. These standards are quite diverse in their nature, their form, their structure, and their methods of implementation, due to various historic, economic, cultural, and political reasons. They also differ in terms of their implementation requirements, such as mandatory versus voluntary approaches. Some of the areas in which they differ include types of uses for the motor vehicles, vehicle categories, greenhouse gas (GHG) emission thresholds, geographical regions, and the like.

The concept of "eco-driving" generally pertains to the energy-efficient use of vehicles. For example, one goal of eco-driving is to reduce fuel consumption from road transport so that less fuel is used to travel the same distance. In the last few decades, engine technology and automotive performance have improved rapidly, but most drivers have not adapted their driving style to these improvements. Eco-driving represents a driving culture which suits modern engines and makes best use of advanced vehicle technologies. Implementation of an eco-driving paradigm may offer numerous benefits, including GHG emission reductions, fuel cost savings, as well as greater safety and comfort.

There are several stakeholders in the automobile industry, such as OEMs (Original Equipment Manufacturers), regulators, vehicle owners, fleet owners, individual drivers, auto dealers, service centers, and insurance companies, each requiring different types of information relating to implementing eco-driving. OEMs require compliance data to be submitted to regulators relating to different classes and brands of vehicles. They also need information on performance of a vehicle or a class of vehicles to facilitate future green-vehicle development. Regulators require access to credible and quality information to support policy formation and monitoring of compliance. Vehicle and fleet owners need to comply with eco-driving practices to optimize the cost of owning a vehicle or a fleet. Individual drivers need feedback on their degree of green driving for self-improvement. Finance and insurance companies require credible and quality information to offer different finance options and interest rates, and to offer differential premiums. Dealers or service centers need information related to vehicle health and driving patterns to offer differential pricing schemes for products and services.

The lack of adequate and reliable information to individual drivers, vehicle owners, and fleet owners prevents them from promoting and practicing eco-driving. Similarly, regulatory bodies lack access to emission information and information on individual driving patterns of a driver for assessment of compliance. OEMs and other stakeholders do not have any effective mechanism to track all these parameters over the lifetime of a vehicle or a class of vehicle. Thus, the development of new vehicle models suitable for a specific place (area, geography-region, country, etc.) becomes practically impossible.

Therefore, there exists a need to provide adequate and reliable information to the various stakeholders such as vehicle owners, drivers, finance and insurance companies, regulators, and OEMs to promote and implement eco-driving.

SUMMARY

One aspect of the present disclosure relates to a system comprising one or more hardware processors, and a memory storing instructions to configure the one or more hardware processors, wherein the one or more hardware processors are configured by the instructions to: identify a driver of a vehicle; determine one or more vehicle condition parameters of the vehicle, wherein the one or more vehicle condition parameters include at least one of: total mileage, tire condition, fuel quality, emission level, brake system condition, clutch system condition, engine system condition, gear system condition, and exhaust system condition; determine one or more driving condition parameters, wherein the one or more driving condition parameters include at least one of: one or more terrain parameters, one or more weather parameters, and one or more traffic parameters; determine one or more driving pattern parameters based at least on the driver's driving pattern, wherein the one or more driving pattern parameters include at least one of: accelerator operation, break operation, gear operation, clutch operation, engine idling, frequency of start-stop, air drag, window control, HVAC usage, tire pressure, vehicle loading, and driving mode selection; calculate an EcoIndex measuring the real-time environmental impact of the vehicle's operation based on the one or more vehicle condition parameters, the one or more driving condition parameters, and the one or more driving pattern parameters; and provide analytical information for controlling vehicle greenhouse gas emissions.

Another aspect of the present disclosure relates to a method comprising: identifying a driver of a vehicle; determining one or more vehicle condition parameters of the vehicle, wherein the one or more vehicle condition parameters include at least one of: total mileage, tire condition, fuel quality, emission level, brake system condition, clutch system condition, engine system condition, gear system condition, and exhaust system condition; determining one or more driving condition parameters, wherein the one or more driving condition parameters include at least one of: one or more terrain parameters, one or more weather parameters, and one or more traffic parameters; determining one or more driving pattern parameters based on the driver's driving pattern, wherein the one or more driving pattern parameters include at least one of: accelerator operation, break operation, gear operation, clutch operation, engine idling, frequency of start-stop, air drag, window control, HVAC usage, tire pressure, vehicle loading, and driving mode selection; calculating an EcoIndex measuring the real-time environmental impact of the vehicle's operation based on the one or more vehicle condition parameters, the one or more driving condition parameters, and the one or more driving pattern parameters; and providing analytical information for controlling vehicle greenhouse gas emissions.

In certain embodiments of the present disclosure, calculating the EcoIndex may comprise: calculating a vehicle condition index based on the one or more vehicle condition parameters; calculating a driving condition index based on the one or more driving condition parameters; calculating a driving pattern index based on the one or more driving pattern parameters; and calculating the EcoIndex based on the vehicle condition index, the driving condition index, and the driving pattern index. The EcoIndex may be calculated as a linear combination of the vehicle condition index, the driving condition index, and the driving pattern index, or as a non-linear polynomial function of the vehicle condition index, the driving condition index, and the driving pattern index.

In certain embodiments of the present disclosure, identifying the driver may comprise determining one or more driver identifiers, wherein the one or more driver identifiers include at least one of: a user ID, a password, a finger print, and a retinal scan; associating the one or more driver identifiers with a driver profile; and authenticating the driver based on the one or more driver identifiers and driver profile.

Analytical information may comprise real-time information comprising providing a low-emission route; providing one or more real-time parameters, wherein the one or more real-time parameters include at least one of: one or more vehicle condition parameters, one or more driving condition parameters; one or more driving pattern parameters, or the EcoIndex; and/or providing a notification or alert to the driver. Systems in accordance with the present disclosure may provide analytical information comprising real-time information using a Vehicle On-Board User Interface. Analytical information may also comprise non-real-time information comprising a summary of the vehicle's operation over the course of a trip; a reward points estimation; a carbon credits estimation; an EcoIndex for one or more specified vehicles; an emission density map; and/or a forecast of usage for one or more specified vehicles.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate embodiments of the invention and together with the description, serve to explain the principles of the invention.

DETAILED DESCRIPTION

As used herein, reference to an element by the indefinite article "a" or "an" does not exclude the possibility that more than one of the element is present, unless the context clearly requires that there is one and only one of the elements. The indefinite article "a" or "an" thus usually means "at least one." The disclosure of numerical ranges should be understood as referring to each discrete point within the range, inclusive of endpoints, unless otherwise noted.

Systems and methods in accordance with the present disclosure may consider the make and model of the vehicle, the vehicle's condition, and may also consider the driving patterns of particular drivers as well as driving conditions (e.g., terrain, traffic, and weather). These considerations may be used to provide analytical information that allows drivers and other interested parties to modulate their own activities to be more eco-friendly.

Figure 1:
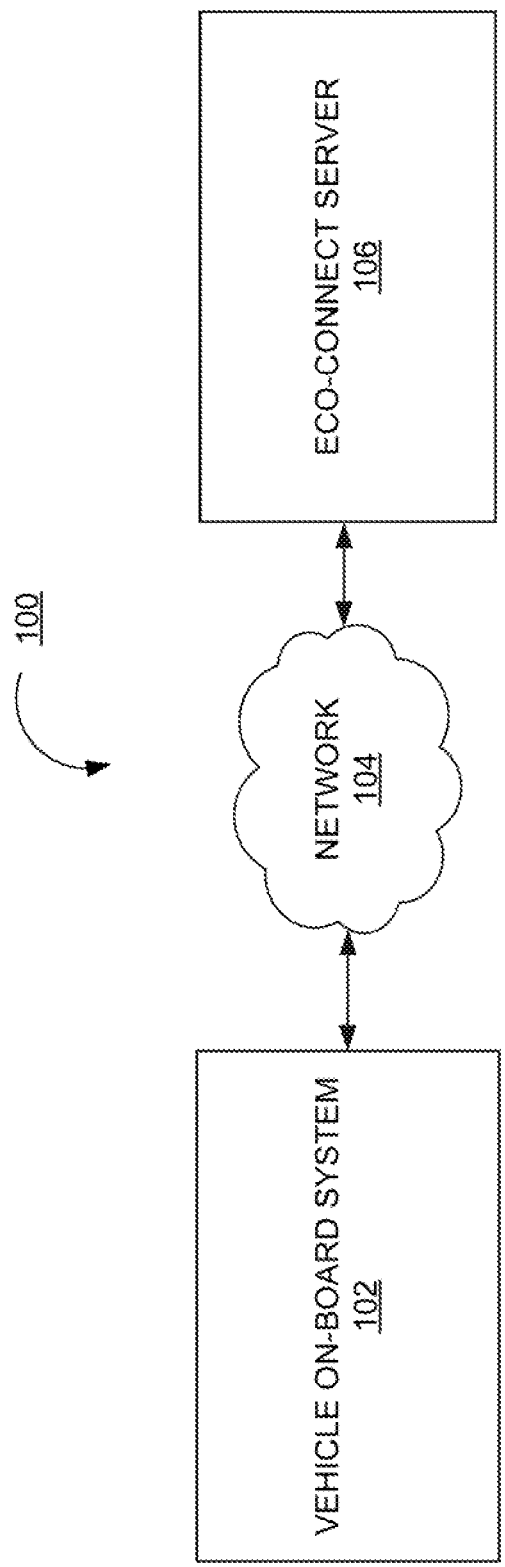
FIG. 1 is a block diagram of an eco-driving system according to an exemplary embodiment, including a vehicle-on-board system communicating with an Eco-Connect Server through a network.

FIG. 1 is a block diagram of an eco-driving system 100 in accordance with certain embodiments of the present disclosure. The eco-driving system 100 may include a vehicle on-board system 102 in communication with an Eco-Connect Server (ECS) 106 through a network 104. The vehicle on-board system 102 may be associated with a vehicle in order to provide interaction between the eco-driving system 100 and a driver, as well to determine various vehicle-based parameters discussed in further detail below, e.g. GHG emission levels. Though only one vehicle on-board system is shown in FIG. 1, it should be recognized that more than one vehicle on-board system may be communication with the ECS 106. Thus, the eco-driving system 100 may be able analyze information regarding one or more vehicles to provide statistically significant analytical information (e.g. average, median, mode, variation, standard deviation, etc. of various determined parameters) regarding the environmental impact of the operation of the one or more vehicles in the aggregate. In certain embodiments network 104 may be a wireless network using known wireless communication protocols, e.g. satellite, 3G, LTE, HSPA, etc.

Vehicle On-Board System

Figure 2:
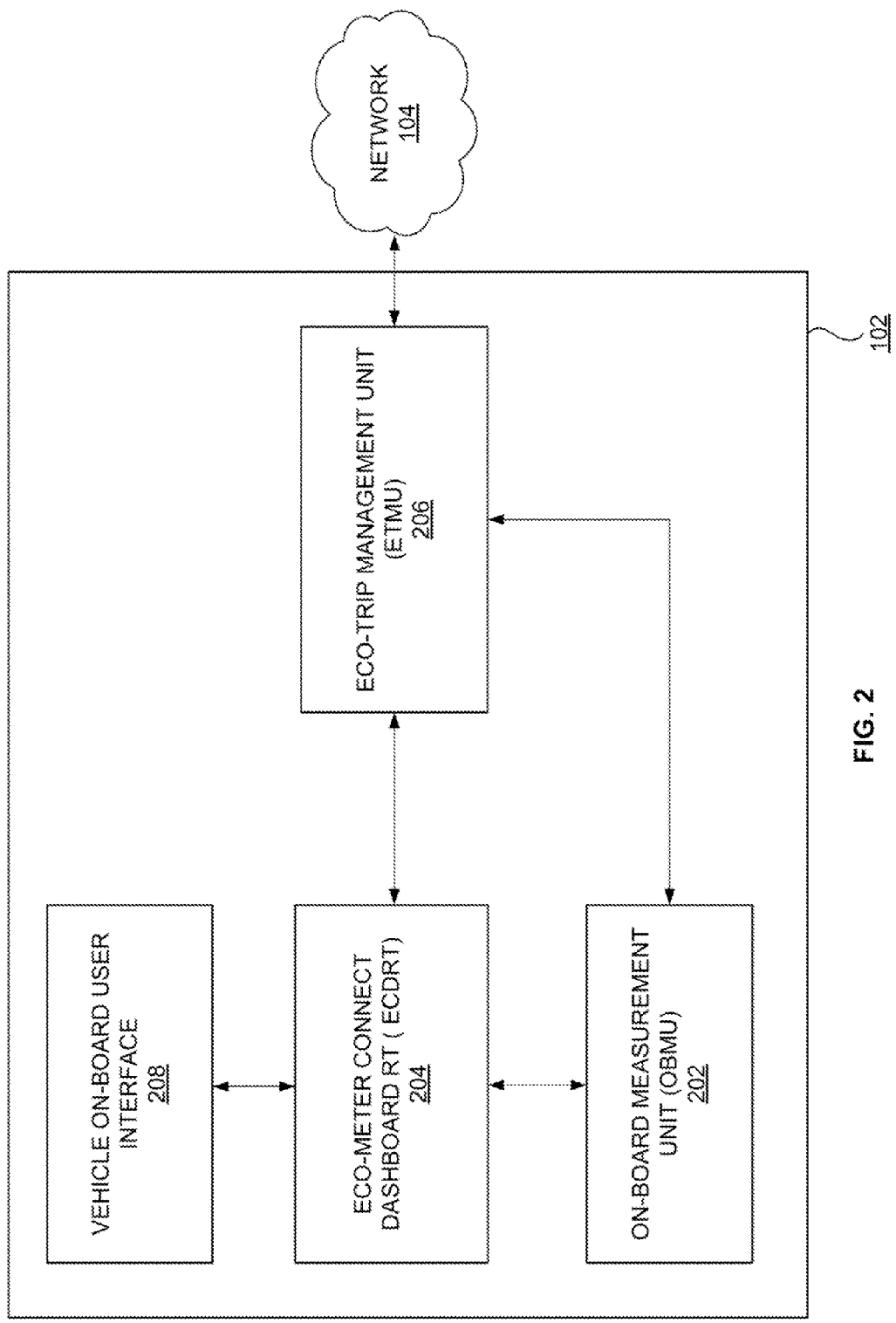
FIG. 2 is a detailed block diagram of an exemplary embodiment of the vehicle-onboard system of FIG. 1.

FIG. 2 is a detailed block diagram of an exemplary embodiment of the vehicle-onboard system 102 of FIG. 1. The vehicle on-board system 102 may include an on-board measurement unit (OBMU) 202, an eco-trip management unit (ETMU) 206, and an eco-meter connect dashboard real-time (ECDRT) 204. The ECDRT may also include a vehicle on-board user interface 208.

The OBMU 202 may determine one or more vehicle condition parameters, one or more driving condition parameters, and/or one or more driving pattern parameters. Determination of these parameters may involve the use one or more sensors located on the vehicle. For example, the OBMU 202 may measure real-time GHG emissions using a GHG sensor (not shown in FIG. 2) located in the vehicle's exhaust system. A vehicle on-board global-positioning system (not shown in FIG. 2) may be used by the OBMU 202 to determine coordinates corresponding to the vehicle's location. Other sensors that may be used by the OBMU 202 include accelerometers (to determine, for example, the acceleration of the vehicle), gyroscopes (to determine, for example, the vehicle inclination/declination), temperature sensors (to determine, for example, the internal and external temperature of the vehicle), barometers (to determine, for example, the internal and external pressure of the vehicle), etc. It is also envisioned that the OBMU 202 may take advantage of pre-existing vehicle sensors. For example, the vehicle's odometer may be used by the OBMU 202 to determine the total mileage driven by the vehicle and the vehicle's speedometer may be used by the OBMU 202 to determine the vehicle's speed. The OBMU 202 may also use an on-board diagnostic port, for example one typically used by service technicians to provide vehicle maintenance, to obtain vehicle diagnostic information.

The OBMU 202 may also provide support for driver identification or authentication by the eco-driving system 100, by determining one or more driver identifiers needed to identify or authenticate a driver. In cases where, for example, biometric information is needed to identify or authenticate a driver, the OBMU 202 may determine one or more relevant biometric parameters. Thus, if driver identification or authentication requires the driver to provide a fingerprint, OBMU 202 may obtain and/or record the driver's fingerprint from a fingerprint scanner.

The OBMU 202 may thus determine, inter alia, one or more parameters regarding a vehicle and vehicle operation, including, for example, vehicle model and type, baseline emission values, fuel quality, patterns of accelerating, braking, speeding, idling, mismatching gears, terrain, weather, traffic, etc. Such parameters may be broadly characterized as vehicle condition parameters (e.g. parameters relating to the physical condition of a vehicle), driving pattern parameters (e.g. parameters relating to the manner in which the vehicle is operated by a driver), and driving condition parameters (e.g. environmental factors experienced during operation of the vehicle by a driver). Accordingly, the OBMU 202 may determine one or more vehicle condition parameters, one or more driving condition parameters, and/or one or more driving pattern parameters.

The one or more vehicle condition parameters may quantify various aspects relating to the physical characteristics of a vehicle. Examples of vehicle condition parameters include, for example, total mileage, tire condition (e.g. tire pressure, tire tread thickness, etc.), fuel quality (e.g. octane level, etc.), emission level (e.g. concentration of GHG emissions in exhaust, amount of GHG emissions over the vehicle's lifetime, amount of GHG emissions since vehicle ignition or over the course of a trip, amount of GHG emissions over a certain distance traveled by the vehicle, amount of GHG emissions over a certain time period, etc.), brake system condition (e.g. thickness of brake pad, etc.), clutch system condition, engine system condition, gear system condition, and/or exhaust system condition (e.g. catalytic converter efficiency, etc.). One or more vehicle condition parameters may be associated with a vehicle in a vehicle profile (discussed in further detail below).

The one or more driving pattern parameters may quantify various aspects relating to the manner in which a driver operates a vehicle. Examples of driving pattern parameters include accelerator operation (e.g. number of hard accelerations, frequency of hard accelerations, and/or average change in engine RPM during application of the accelerator, etc.), brake operation (e.g. number of hard brakes, etc.), gear operation (e.g. number of shifts, time spent in a particular gear, etc.), clutch operation, engine idling (e.g. time spent idling, etc.), frequency of start-stop, air drag (e.g. window control, etc.), loading, and/or HVAC operation (e.g. time spent operating AC, energy expended heating/cooling the vehicle interior, rate of energy expended heating/cooling the vehicle interior, etc.). One or more driving pattern parameters may be associated with a driver in a driver profile (discussed in further detail below).

The one or more driving condition parameters may quantify various aspects relating to environmental condition conditions experienced by a vehicle. Examples of driving condition parameters include, for example, one or more terrain parameters, one or more weather parameters, and/or one or more traffic parameters. The one or more terrain parameters may include, for example, gradient, curve, elevation and/or surface. The one or more weather parameters may include, for example, humidity, temperature, wind speed, wind direction, and/or visibility. The one or more traffic parameters may include, for example, drift velocity, road type, density of signals, and/or time of day.

Quantification of certain parameters having a qualitative aspect may depend on the determination of other quantitative parameters. For example, to determine the qualitative "road type" driving condition parameter, systems and methods in accordance with the present disclosure may determine underlying quantitative physical parameters, such as elevation, firmness, friction, and the like, which may be then used in empirical relationship to determine the value of the road type parameter. Experiments and simulations may be conducted to determine empirical relationships between measured values and a parameter. Thus, for example, the terrain surface parameter may be determined from an empirical relationship taking into account accelerator data along the axis perpendicular to the road surface (a measure of road roughness) and rate of deceleration after brake application (a measure of road slipperiness). In certain embodiments, the value of parameters may be discretized such that the parameter may take on only certain values. For example, a parameter related to engine idling may adopt the value of 0 or 1, with 0 indicating that the vehicle is not idling and 1 indicating that the vehicle is idling. Measurements may also be calibrated by conducting laboratory experiments and simulations. Thus the accuracy and precision of the determined parameter may be improved.

The OBMU 202 may also determine the value of parameters at certain time intervals and/or distance intervals. In an exemplary embodiment, such determination may occur at regular time intervals, for example, once every 0.5 seconds, once every second, once every minute, once every 2 minutes, once every 5 minutes, once every 10 minutes, etc. In other embodiments, such determination may occur at irregular time intervals, such as, for example, in a stochastic random fashion such that there is at least a 50% chance that a parameter will be determined within a certain time period, e.g. one minute, since it was last determined. The frequency of determination of a parameter may also be defined by regular and/or irregular distances traveled by the vehicle. For example, OBMU 202 may determine emissions level as the amount of GHG emissions every mile, every 2 miles, every 10 miles, etc. traveled by the vehicle. The frequency of determination of parameters may be independent. Thus, for example, the OBMU 202 may determine a vehicle's location using a GPS sensor once every second, but may determine a driver identifier needed for driver identification or authentication once per trip (e.g. once every time the vehicle is started).

Parameters determined by OBMU 202 may be passed to the ETMU 206, which may then calculate an EcoIndex measuring the real-time environmental impact or environmental friendliness of the vehicle's operation based on the determined parameters. For example, OBMU 202 may determine one or more vehicle condition parameters, one or more driving pattern parameters, and/or one or more driving condition parameters. OBMU 202 may then communicate these parameters to the ETMU 206, which may then calculate the EcoIndex based on the one or more vehicle condition parameters, the one or more driving pattern parameters, and/or the one or more driving condition parameters. In certain embodiments, the EcoIndex may be calculated as a linear combination of the one or more vehicle condition parameters, the one or more driving pattern parameters, and/or the one or more driving condition parameters. In other embodiments, the EcoIndex is calculated as a non-linear polynomial function of the one or more vehicle condition parameters, the one or more driving pattern parameters, and/or the one or more driving condition parameters. The ETMU 206 may obtain coefficients and/or exponents from the ECS 106. Further disclosure regarding exemplary calculations of the EcoIndex is provided below (see Module 1). Higher EcoIndex values correlate with increased harm to the environment, e.g. higher levels of GHG emissions, while lower EcoIndex indicate more environmentally-friendly driving activity, e.g. environmentally conscious driving patterns.

ETMU 206 may also calculate an "instantaneous" EcoIndex based on parameters determined by OBMU 202, e.g. the one or more vehicle condition parameters, the one or more driving pattern parameters, and/or the one or more driving condition parameters. The instantaneous EcoIndex may be calculated at certain time intervals and/or distance intervals. For example, the EcoIndex may be calculated at regular time intervals, for example, once every 0.5 seconds, once every second, once every minute, once every 2 minutes, once every 5 minutes, once every 10 minutes, etc. In other embodiments, ETMU 206 may calculate the instantaneous EcoIndex at irregular time intervals, for example, in a stochastic random fashion such that there is at least a 50% chance that the instantaneous EcoIndex will be calculated within a certain time period, e.g. one minute, since it was last calculated. The frequency of determination of the instantaneous EcoIndex may also be defined by regular and/or irregular distances traveled by the vehicle. For example, ETMU 206 may calculate an instantaneous EcoIndex every mile, every 2 miles, every 10 miles, etc. traveled by the vehicle.

ETMU 206 may also employ statistical values (e.g. mean, median, mode, etc.) of the parameters determined by the OMBU 202 used to calculate the instantaneous EcoIndex. For example, the ETMU 206 may record a parameter determined by the OMBU 202 over a certain time period (e.g. one minute). At the conclusion of the time period, the ETMU 206 may obtain a mean value of the parameter and calculate the EcoIndex based on the mean value, rather than the parameter's value at the conclusion of the time period. The use of statistical parameter values may improve the accuracy and/or precision of the instantaneous EcoIndex by reducing the variation of the parameter(s) used to calculate the EcoIndex.

The ETMU 206 may also communicate the calculated instantaneous EcoIndex values to the ECS 106 for further analysis (discussed in additional detail below). As shown in the exemplary embodiment of FIG. 2, the ETMU 208 may be in communication with the ECS 106 via network 104. The ETMU 206 may also communicate the parameters determined by OBMU 202 to the ECS 106 for further analysis (discussed in additional detail below). The ETMU 206 may also facilitate communication between the ECDRT 204 and the ECS 106.

The vehicle on-board system 102 may include ECDRT 204, which may manage the real-time interactions between the eco-driving system 100 and the driver or other user. In the exemplary embodiment shown in FIG. 2, the ECDRT 204 includes a vehicle on-board user interface 208 that allows the eco-driving system 100 to provide real-time feedback to the driver and, conversely, allows the driver to interact with the eco-driving system 100. The vehicle on-board user interface 208 may comprise, for example, a visual display or monitor, a graphical user-interface, an audio speaker, a microphone, voice recognition software, a resistive/capacitive touch-sensitive surface, a keyboard, a stylus, a mobile computer, and/or the like.

The real-time feedback provided by the ECDRT 204 may comprise one or more parameters obtained during operation of the vehicle, such the parameters determined by OBMU 202, e.g. the one or more vehicle condition parameters, the one or more driving condition parameters, and/or the one or more driving pattern parameters. For example, the real-time feedback may comprise the frequency or number of start-stops performed by the driver, the frequency or number of hard brakes, engine idling time, total amount (tons) of GHG emissions over the vehicle's lifetime, total amount (tons) of GHG emissions since vehicle ignition, etc. The ECDRT 204 may provide the real-time feedback using the vehicle on-board user interface 208, for example using a graphical user-interface. The ECDRT 204 may also provide other real-time feedback such as driver alerts and/or messages (e.g. low-fuel alerts, oil-change alerts, manufacturer recall notices, etc.), and/or low-emission route guidance (discussed in further detail below). In certain embodiments, real-time feedback may be obtained by the ECDRT 204 from OMBU 202. In other embodiments, the ECDRT 204 may obtain the real-time feedback from the ETMU 206. The ECDRT 204 may also integrate other value-added services such as location-based services, social media, etc. Such information and value-added services may be provided to the driver using the vehicle on-board user interface 208.

As mentioned above, a driver (or other user) may interact with the eco-driving system 100 using the ECDRT 204, for example, by providing input via the vehicle on-board interface 208. In certain embodiments, the ECDRT 204 supports driver identification and/or authentication by determining one or more driver identifiers via the vehicle on-board interface 208. For example, the driver may input a user ID and/or a password using a keyboard or a touch-screen keyboard of the vehicle on-board user interface 208, or may provide a voiceprint identification using a microphone of the vehicle on-board user interface 208. Upon success or failure of identification and/or authentication of the driver, the ECDRT 204 may inform the driver of the successful or failed identification and/or authentication via an indication presented using the vehicle on-board user-interface. For example, the ECDRT 204 may display a message on a visual display of the vehicle on-board user interface 208 or may play a message using an audio speaker of the vehicle on-board user interface 208. Value-added services such as social-media access or location-based services may be provided by the ECDRT 204, for example, via an Internet browser graphical user-interface being executed by the ECDRT 204, via visual display of the vehicle on-board user interface 208 to the driver, and/or by execution by the ECDRT 204 of one or more third-party applications which may access Internet-based resources via ETMU 206 and network 104.

Certain embodiments of the ECDRT 204 may also support providing navigational aid for a low-emission route to the driver. For example, ECDRT 204 may obtain a desired destination (e.g. an address, GPS coordinates, etc.) from the driver via the vehicle on-board user interface 208. For example, the driver may provide a destination using a keyboard or a touch-screen keyboard of the vehicle on-board user interface 208, or may speak a destination, which is then recorded by the vehicle on-board user interface 208 using a microphone and parsed using voice-recognition algorithms executed by the vehicle user on-board interface 208 or the ECDRT 204. The ECDRT 204 may transmit the destination and vehicle's GPS location or a starting location to the ECS 106 via ETMU 206 in communication with ECS 106 via network 104. The ECS 106 may then determine one or more low-emission routes (discussed in further detail below) and transit the low-emission routes to the ECDRT 204 via ETMU 206 in communication with ECS 106 via network 104. The ECDRT 204 may present the determined low-emission routes to the driver using the vehicle on-board user interface 208.

The ECDRT 204 may then obtain the driver's selection via the vehicle on-board user interface 208, and transmit the selection to the ECS 106 via ETMU 206 in communication with ECS 106 via network 104. The ECS 106 may then transmit the selected low-emission route to a vehicle navigation system (not shown in FIG. 2). The ECDRT 204 may also provide route guidance to the driver via the vehicle on-board user interface 208. For example, the ECDRT 204 may display, via a visual display or graphical user-interface of the vehicle on-board user interface 208, a map highlighting the selected low-emission route along with the vehicle's GPS location determined by OMBU 202.

Eco-Connect Server (ECS)

Figure 3:
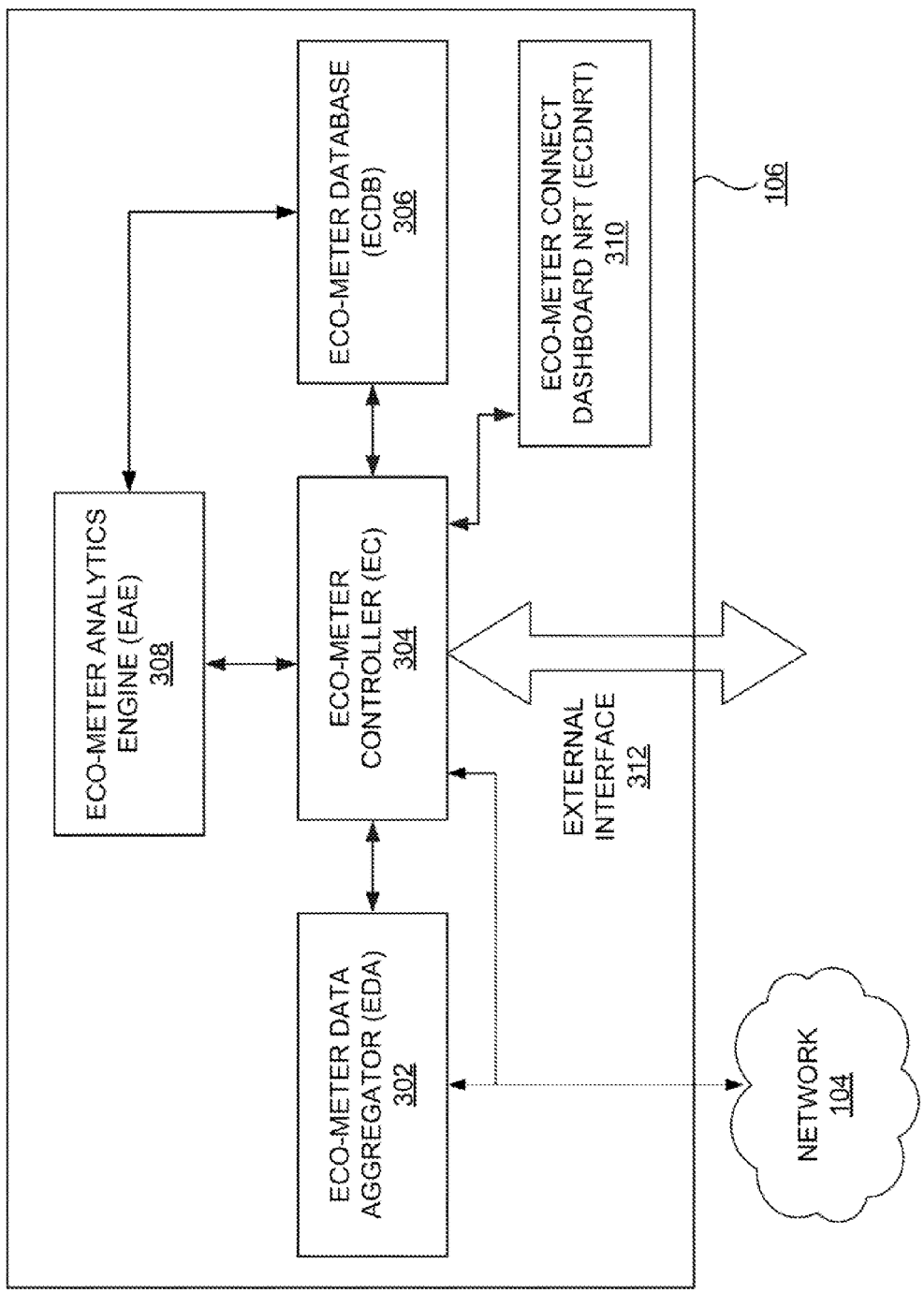
FIG. 3 is a detailed block diagram of an exemplary embodiment of the Eco-Connect Server shown in FIG. 1.

FIG. 3 is a detailed block diagram of an exemplary embodiment of the ECS 106 of FIG. 1. The ECS 106 may comprise an eco-meter data aggregator (EDA) 302, an eco-meter controller (EC) 304, an eco-meter database (ECDB) 306, an eco-meter analytics engine (EAE) 308, an eco-meter connect dashboard non-real-time (ECDNRT) 310, and an external interface 312. These components of the ECS 106 may be embodied as dedicated physical hardware or as one or more hardware processors configured to perform the functions and manipulative steps herein described.

The EC 304 may serve as a central controller and communications hub for the eco-driving system 100. Accordingly, the EC 304 may process requests for information by various subsystems of the eco-driving system 100. For example, as discussed above, ETMU 206 may request that the ECS 106 provide low-emission routes based on the GPS location of the vehicle and a destination obtained from the driver. That request may be routed by the EC 304, which may forward the request to the EAE 308. EAE 308 may determine the low-emission routes and provide the information to the EC 304 which may route the information to the ETMU 206 via network 104 thus fulfilling the request. Alternatively, the EAE 308 may request additional information and obtain that information using external interface 312, For example, EAE 308 may request map data and then obtain third-party map data using external interface 312. The EC 304 thus may prevent race conditions from developing from competing requests or transmissions from the various subsystems of the eco-driving system 100 (thereby preserving the integrity of data stored by the eco-driving system, for example, in the ECDB 306), as well as serving as a security feature by preventing too many requests or transmissions from a compromised subsystem.

The EDA 302 may accumulate, aggregate, and/or record data received from the ETMU 206 via network 104. In certain embodiments, the accumulation and/or aggregation of data by the EDA 302 may be triggered by the conclusion of a trip. A trip may refer to, for example, a period of time starting from ignition of the vehicle's engine and ending with shutting-off of the engine. Alternatively, a trip may refer to a set time period, e.g. a twenty-four hour period. The conclusion of a trip may be determined by the vehicle on-board system 102 (e.g. by the ETMU 206 or the OBMU 202) with a signal sent to the ECS 106. The signal may be received by the EC 304 which may then instruct the EDA 302 to begin aggregating data from the ETMU 206. The EDA 302 may aggregate all data recorded by the vehicle on-board system 102, including, for example values of the one or more vehicle condition parameters, the one or more driving pattern parameters, and/or the one or more driving condition parameters determined by OBMU 202 over the course of a trip.

In certain embodiments, aggregation or accumulation of data by the EDA 302 may include compiling or constructing a data tuple comprising a parameter determined by the vehicle on-board system 102 (e.g. by OBMU 202) and at least one of a vehicle identifier, a vehicle profile, a driver identifier, a driver profile, a trip identifier, a GPS location corresponding to the location of the vehicle at the time the parameter was determined, or a time that the parameter was determined. The EDA 302 may transmit one or more data tuples to the EC 304, which may forward the data tuples to a subsystem of the ECS 106, e.g. the ECDB 306 or the EAE 308.

The ECDB 306 may be embodied by, for example, a relational database. Along with storing information aggregated by EDA 302, the ECDB 306 may also store one or more driver profiles, one or more vehicle profiles and/or one or more trip profiles or summaries. A driver profile may be associated with a driver and may comprise at least one of: one or more driver identifiers (e.g. the driver's name, age, gender, biometric information, user ID, password, etc.), driving history (e.g. total miles driven, total time spent driving, average distance traveled, routes driven, accidents (e.g. number, type, severity, description etc. of accidents involving the driver), insurance claims (e.g. dollar value of claims, number of claims, etc.), traffic violations, etc.), vehicles driven, GHG emissions produced by the driver's driving, one or more driving pattern parameters, etc. A vehicle profile may be associated with a vehicle and may comprise at least one of: the vehicle's make and/or model, the vehicle's age, one or more vehicle identifiers (e.g. a VIN etc.), total mileage, accident history, repair history, one or more vehicle conditions parameters, etc. A trip profile or summary may be associated with a trip undertaken by a driver driving a vehicle and may comprise at least one of: one or more trip identifiers (e.g. a unique integer value relative to all other trip identifiers stored in ECDB 306), one or more driver identifiers of the driver, one or more vehicle identifiers of the vehicle, a driver profile associated with the driver, a vehicle profile associated with the vehicle, a route, an amount of GHG emissions produced during the trip, one or more vehicle conditions parameters determined during the trip, one or more driving pattern parameters determined during the trip, etc.

In certain embodiments, a driver profile, a vehicle profile, and a trip profile or summary stored in the ECDB 306 may comprise, respectively, a Driver EcoIndex, a Vehicle EcoIndex, and a Trip EcoIndex. The Driver EcoIndex, Vehicle EcoIndex, and Trip EcoIndex allow comparison of the environmental friendliness between drivers, vehicles, and trips. For example, drivers A and B may each be associated with a driver profile stored in ECDB 306; the driver profiles may each comprise a Driver EcoIndex. If the Driver EcoIndex stored in the driver profile associated with driver A is, for example, higher than the Driver EcoIndex stored in the driver profile associated with driver B, the eco-driving system 100 may determine that driver A is less environmentally friendly than driver B. Driver EcoIndex, Vehicle EcoIndex, and Trip EcoIndex values may be calculated by the EAE 308 based on, for example, instantaneous EcoIndex values obtained from ETMU 206 and aggregated by EDA 302 (discussed in further detail below).

The EAE 308 analyzes information stored in the ECDB 306 and other information (for example, third-party information obtained by EC 304 via external interface 312) to provide analytical information for, inter alia, controlling GHG emissions. The analytical functions with which the EAE 308 may be involved include one or more of driver/vehicle profiling, generating trip profiles or summaries, comparing driver performance, determining low-emission routes, estimating reward points or driver incentive points, estimating carbon credit points, estimating an eco-factor for an annual maintenance contract (AMC), generating emission density maps ("eco-contouring"), optimizing vehicle fleet operating costs, etc.

Driver/vehicle profiling by the EAE 308 may be triggered upon completion of aggregation of data by the EDA 302, or may occur in batch-mode on a set schedule. Where the driver/vehicle profiling is triggered by the EDA 302, EC 304 may instruct EAE 308 to perform driver/vehicle profiling on one or more drivers and/or vehicles for which the EDA 302 has aggregated information. In batch-mode, the EAE 308 may also perform driver/vehicle profiling on all drivers and/or vehicles for which one or more driver identifiers and/or one or more vehicle identifiers is stored in the ECDB 306. In any case, driver/vehicle profiling by the EAE 308 may comprise updating information stored in one or more driver profiles and/or one or more vehicle profiles. EAE 308 may update the one or more driver profiles and/or the one or more vehicle profiles based on information aggregated by EDA 302 stored in ECDB 306. For example, EAE 308 may update the total mileage stored in a vehicle profile associated with a vehicle by incrementing the value thereof by the distance traveled by vehicle as determined by the vehicle on-board system 102 (e.g. by OBMU 202) and reported by the ETMU 206.

EAE 308 may also calculate and/or update the Driver EcoIndex and/or the Vehicle EcoIndex based on the instantaneous EcoIndex values aggregated by the EDA 302. EAE 308 may, for example, calculate or update a Driver EcoIndex of a driver profile associated with a driver as the mean of all instantaneous EcoIndex values determined by the eco-driving system 100. Thus, where aggregation by EDA 302 comprises forming data tuples associating instantaneous EcoIndex values with, e.g. a driver profile, EAE 308 may transmit a database query via EC 304 to ECDB 306 to return all data tuples of instantaneous EcoIndex values associate with the driver profile. EAE 308 may then calculate the arithmetic mean of all returned values—the result of which may be stored in ECDB 306 as the calculated and/or updated Driver EcoIndex. A similar algorithm may be employed to calculate a Vehicle Econdex of a vehicle profile associated with a vehicle, and/or a Trip EcoIndex of a trip profile or summary.

The ECS 106 may generate a trip profile or summary using analyses performed by EAE 308. The trip profile or summary may be provided to the driver at the conclusion of a trip, using, for example, the vehicle on-board user interface 208. To provide a trip profile or summary, EAE 308 may transmit a database query to ECDB 306 for all parameters associated with the trip. Where aggregation by EDA 302 comprises forming data tuples associating parameters determined by the vehicle on-board system 102 with a trip identifier, the database query may request all parameters associated with the trip identifier associated with the trip. EAE 308 may then create a trip profile or summary based on the returned parameters. For example, EAE 308 may determine the distance traveled during the trip by subtracting the vehicle total mileage determined at or near the beginning of the trip from the vehicle total mileage determined at or near the end of the trip. EAE 308 may also determine the Trip EcoIndex by calculating the arithmetic mean of the instantaneous EcoIndex values associated with the trip or trip identifier. Where OBMU 202 determines the amount of GHG emissions emitted by the vehicle over a regular time or distance interval, the EAE 308 may determine the total amount of GHG emissions by summing the returned GHG emissions level parameter. Exemplary embodiments of other analyses performed by EAE 308 are set forth in the Modules below. For example, other analyses may include estimating reward points or driver incentive points, estimating carbon credit points, estimating an eco-factor for an annual maintenance contract (AMC), eco-contouring, etc.

Non-real-time output of the ECS 106 may be provided using the ECDNRT 310. Whereas the ECDRT 204 is tied to the vehicle on-board system 102 and provides I/O support via the vehicle on-board user interface 208, the ECDNRT 310 may act as a gateway for stakeholders to access the eco-driving system 100 using a variety of non-vehicle-based user interfaces, such as desktop and laptop computers, smartphones, tablets, personal digital assistants, etc. Using the ECDNRT 310 stakeholders may request non-real-time analysis to be performed by the ECS 106. For example, a vehicle fleet operator may request a comparative performance analysis of his or her driver-employees to determine which drivers have the most eco-friendly driving patterns, e.g. the lowest Driver EcoIndex. The vehicle fleet owner may submit the request using a personal computer in communication with the ECDRT 204, via, for example, the Internet. Stakeholders may receive the results of the requested analyses via output from the ECDNRT 310, for example, through a graphical user interface executed on a device owned by the stakeholder. Thus, a ranked list of drivers may be displayed to the vehicle fleet owner using the personal computer The ECS 106 may comprise an external interface 312 that allows information to be obtained from third parties, such as regulatory information (e.g. GHG emission limits), weather data, map data, etc. The external interface may also allow stakeholders to send information requested by third-parties or other stakeholders. For example, an insurance provider may send a request via ECDNRT 310 for information regarding traffic violations by a driver. ECDNRT 310 may forward the request to the EC 304, which may then send a message via external interface 312 to local law enforcement for relevant driver records using, for example, an e-mail protocol (e.g. SMTP). Local law enforcement may provide the requested information by, for example, sending the relevant records through ECDNRT 310 to the ECS 106 where it is routed by EC 304 through external interface 312 to the insurance provider.

The following Modules represent exemplary embodiments of various algorithms that may be executed by systems and methods in accordance with the present disclosure. Specific reference is made in the Modules to embodiments shown in FIG. 1, FIG. 2, and FIG. 3, but it should be understood that the algorithms may be generalized to other embodiments consistent with the present disclosure.

Module 0

Assess Vehicle Condition

When a vehicle on-board system 102 located on a particular vehicle is activated, initial values for the vehicle condition may be obtained from historical data stored on ECDB 306. However, if the vehicle is fitted with the vehicle-onboard system 102 for the first time, then the condition of the vehicle may be determined based on information obtained from the vehicle-BUS and from a vehicle maintenance reporting (VMR) interface as part of vehicle assessment in the process of vehicle-registration with the vehicle-onboard system 102.

Module 0 may estimate a single index to represent the conditions of the vehicle. For example, at any instant the conditions of the vehicle may be determined using parameters such as total mileage, the condition of one or more tires, quality of the fuel, emission level, the condition of a brake system, a clutch system, an engine system, a gear system, and/or an exhaust system, and the like. These conditions, and their associated coefficients, values, and preferred trend are summarized in the table below:

| Parameters | Coefficient | Values | Trend |
|---|---|---|---|
| Total Mileage | $A_{TM}$ | $V_{TM}$ | Lower is good |
| Tire Condition | $A_{TC}$ | $V_{TC}$ | Lower is good |
| Fuel Quality | $A_{FC}$ | $V_{FC}$ | Lower is good |
| Emission Level | $A_{EL}$ | $V_{EL}$ | Lower is good |
| Brake System Condition | $A_{BS}$ | $V_{BS}$ | Lower is good |
| Clutch System Condition | $A_{CS}$ | $V_{CS}$ | Lower is good |
| Engine System Condition | $A_{ES}$ | $V_{ES}$ | Lower is good |
| Gear System Condition | $A_{GS}$ | $V_{GS}$ | Lower is good |
| Exhaust System Condition | $A_{EX}$ | $V_{EX}$ | Lower is good |

At any given instant, the condition of a vehicle may be expressed as a Vehicle Condition (VC) index, which can be determined, for example, with the foregoing set of parameters, based on a linear relationship:

$$VC = A_{TM}*V_{TM} + A_{TC}*V_{TC} + A_{FC}*V_{FC} + A_{EL}*V_{EL} + A_{BS}*V_{BS} + A_{CS}*V_{CS} + A_{ES}*V_{ES} + A_{GS}*V_{GS} + A_{EX}*V_{EX}$$

Similarly, with a larger set of parameters, VC can, for example, be determined as $\Sigma A_i * V_i$, where i ranges from 1 to N, where N is the total number of parameter values $V_i$ used in the calculation, and $A_i$ is the coefficient of combination of each of the parameters. However, a more accurate VC may be determined using a non-linear relationship between the parameters, in which case, VC can be represented as $VC = F_n(V_i)$, wherein $F_n$ may be a polynomial of order N, e.g. $VC = \Sigma A_i * V_i \hat{} P_i$.

The method may thus include one or more of the following:

| Step | Title | Description |
|---|---|---|
| 1 | Obtain Vehicle Condtiion information | OBMU 202 may obtain one or more vehicle condition parameters through sensors and/or interfaces. |
| 2 | Obtain coefficients | In case valid values of the coefficients are present in the ETMU 206 locally, these coefficient values may be used. Otherwise, the ETMS 206 may obtain coefficient values from the EC 304. |
| 3 | Estimate instantaneous value of Vehicle Condition index | Instantaneous value of the VC may be estimated using the obtained parameters and combning them using formula provided above. |

Module 1

EcoIndex Estimation

At any given instant, the EcoIndex may be determined based on, for example, a linear relationship $EcoIndex = C_{VC}*VC + C_{DC}*DC + C_{DP}*DP$, where VC is the vehicle condition index set forth in Module 0, DC is the driving condition index set forth in Module 4 (discussed below), DP is the driving pattern index set forth in Module 5 (discussed below), and $C_{VC}$, $C_{DC}$, and $C_{DP}$ are coefficients. As another example, the EcoIndex may be expressed as a non-linear function: $EcoIndex = C_{VC}*VC^P + C_{DC}*DC^Q + C_{DP}*DP^R$.

The method may also include one or more of the following:

| Step | Title | Description |
|---|---|---|
| 1 | Estimate Vehicle Condition index | ETMU 206 estimates Vehilce Condition index using the method of Module 0. |
| 2 | Estimate Driving Condition index | ETMU 206 estimates Driving Condition index using the method of Module 4. |
| 3 | Estimate Driving Pattern index | ETMU 206 estimates Driving Pattern index using the method of Module 5. |
| 4 | Estimate instantaneous EcoIndex | ETMU 206 then estimates an instantaneous value of EcoIndex from the estimated values of the Vehicle Condition index, Driving Condition index and Driving Pattern index, using the formula set out above. |
| 5 | Obtain coefficients | In case valid values of the coefficients are present in the ETMU 206 locally, these coefficient values may be used. Otherwise, ETMU 206 may obtain coefficient values from the EC 304. |
| 6 | Update Trip EcoIndex | Update the value of Trip EcoIndex by factoring with an instantaneous value of EcoIndex. |
| 7 | Update Vehicle EcoIndex | Update the value of Vehicle EcoIndex by factoring with the instantaneous value of EcoIndex. |
| 8 | Update Driver EcoIndex | Update the value of Driver EcoIndex by factoring with the instantaneous value of EcoIndex. |

The Trip EcoIndex, Vehicle EcoIndex, and Driver EcoIndex may be obtained by factoring with the instantaneous EcoIndex. For example, a Driver EcoIndex may be computed as a time-average or arithmetic mean of instantaneous EcoIndex values obtained during operation of one or more vehicles operated by a driver. The Driver EcoIndex may be associated with a driver profile. Similarly, a Vehicle EcoIndex may be associated with a vehicle profile.

Module 2

Driver Comparison

The driver comparison module may provide a ranking of drivers based on different parameters as suitable for different scenarios. The ranking may be determined using analysis of the certain parameters of different drivers, e.g. parameters stored in the driver profiles associated with the drivers. These parameters may include personal attributes (e.g. age, sex, location, etc.), class of vehicles driven (e.g. light motor vehicles, heavy motor vehicles, heavy commercial vehicles, electric vehicles, hybrid vehicles, vehicle make, vehicle model, vehicle type, etc.), driving conditions (discussed in further detail with respect to Module 4), driving pattern (discussed in further detail with respect to Module 5), a Driver EcoIndex, and/or one or more driver identifiers (e.g. user ID, password, fingerprint, retinal scan, voiceprint, etc.).

The driver comparison model may also provide analytical information regarding one or more drivers based on a set of analysis parameters. For example, a user (e.g. a vehicle fleet operator) may desire to know whether certain vehicles are preferred by drivers that are of a particular age. Accordingly, the user may select driver age and class of vehicles driven, as analysis parameters. The eco-driving system 100 may then provide an analysis, e.g. average age of drivers of a class of vehicles, based on driver profiles.

The method may include one or more of the following:

| Step | Title | Description |
|---|---|---|
| 1 | Obtain user choice on the analysis parameters | ECDNRT 310 may obtain a choice from the user on the analysis parameters and forward the information to the EC 304. |
| 2 | Obtain driver profiles, driver EcoIndex and driver behavior history | EC 304 may obtain the driver profiles, Driver EcoIndex and other driver-related information from the ECDB 306 based on user choice of parameters. |
| 3 | Analyze driver profile data | EAE 308 may obtain inputs from the EC 304 and additional data from the ECDB 306 when necessary and performs comparative and aggregative analysis based on the choice of parameters obtained from the user. |
| 3 | Presentation of analyzed profile data | The EAE 308 may present the analyzed profile data and presents it to the user through ECDNRT 310. |

Thus, the driver comparison module may provide ranking based on a pre-defined set of analysis parameters

Module 3

Low-Emission Route Identification

Systems and methods in accordance with the present disclosure may provide one or more low-emission routes based on information provided by a user/driver. For example, the eco-driving system 100 may provide one or more low-emissions routes based on a starting location, a destination, and time.

The method may include one or more of the following:

| Step | Title | Description |
|---|---|---|
| 1 | Obtaining the start and destination information | ECDRT 310 may obtain the start, the destination, and the time information from the driver. |
| 2 | Determination of possible low emission routes | ETMU 206 may obtain values from the user and may then send a request to the EDA 302. The EDA 302 may transmit the request to the EC 304 to provide one or more low-emission routes. The EC 304 may first obtain related context information (driving condition, vehicular info, etc.) from the ECDB 306. Then the EC 304 may search for a presence of all the possible routes and respective emission estimate information from the ECDB 306. The EC 304 may obtain information from third-party sources, e.g. GPS and mapping data. In case the information is not available, the EC 304 may use the EAE 308 to define all possible routes using existing route-segment information and related emission information to create all possible route entries in the ECDB 306. And then the EC 304 may provide the EDA 302 with information about the all the routes in order of emission values (e.g. in increasing or decreasing order). |
| 3 | Displaying route information to the driver | The EDA 302 may send the requested route information to the ETMU 206 individually or in batches depending on a preference of the driver and/or available communication bandwidth. The ETMU 206 may provide the information to the ECDRT 204. The ECDRT 204 may display the route and emission information to the driver one at a time in order of increasing or decreasing emission value. The driver has the option to see all the routes and/or segments with emission values by using the ECDRT 204, through, for example the vehicle on-board user interface 208. |
| 4 | Obtaining user choice of route | Possible routes with increasing emission values may be displayed on the ECDRT 204. The user may select a route of his/her choice, which is processed within the ETMU 206 and transmitted to the EDA 302. The EDA 302 may transmit/forward the user choice to the EC 304, which processes the information and communicates with other systems that need this information. For example, EC 304 may communicate with a vehicle navigation system. |

Module 4

Determination of Driving Conditions

Driving conditions may be specific to a trip, and they may represent the conditions (e.g., terrain, weather, traffic, etc.) in which a driver is driving a vehicle. This model may determine a Driving Condition index that represents the driving condition at an instant at a location on the route as part of a trip. Driving conditions may depend on one or more of conditions of the route (e.g., terrain, road surface, etc.), weather, and traffic conditions. The traffic condition can be determined historically and/or instantaneously. Traffic profile (e.g., historical pattern) information (over route or time) can be obtained from the ECS 106 or can be obtained from external sources by the EC 304. In case of a new route, necessary traffic profile information can be obtained from the external sources. In another instance, the basic traffic profile information can be manually entered during a new route definition process.

Determination of driving conditions may include one or more of: defining a terrain profile, defining a traffic profile, or defining a weather profile. A terrain profile may include one or more of road conditions, signals, bumps, pot-holes, width (intercity, highway, internal road, lane), length, turns, elevation (gradient), number of intersections, pedestrian/level-crossing, defined speed-limits, road-slip (mud, water, loose stone), etc. A traffic profile may include one or more of average speed, throughput, vehicle density, traffic incident frequency (accidents, congestion, etc.), constrictions (work-zone, one-way/both-ways/diversions/detours), time of day, etc. A weather profile may include precipitation (rain, snow, sleet, etc.), visibility, etc. The weather profile may be determined by OBMU 202 using appropriate sensors or using third-party sources based on GPS location data.

In certain embodiments, the Driving Condition index can be determined at any instant using parameters like terrain gradient, terrain curve, terrain surface, weather humidity, weather-humidity, weather-temperature, weather wind-speed, weather-visibility, traffic-drift velocity, traffic-road type, traffic-density of signals, traffic-time of the day, etc.

Exemplary classes and associated parameters, coefficients, parameter values, and preferred trends are shown in the table below.

| Class | Parameters | Coefficient | Parameter Value | Trend |
|---|---|---|---|---|
| Terrain | Gradient | $C_{GR}$ | $V_{GR}$ | Lower is good |
| | Curve | $C_{CU}$ | $V_{CU}$ | Lower is good |
| | Surface | $C_{SU}$ | $V_{SU}$ | Lower is good |
| Weather | Humidity | $C_{HU}$ | $V_{HU}$ | Lower is good |
| | Temperature | $C_{TM}$ | $V_{TM}$ | Lower is good |
| | Wind Speed | $C_{WS}$ | $V_{WS}$ | Lower is good |
| | Visibility | $C_{VS}$ | $V_{VS}$ | Lower is good |
| Traffic | Drift velocity | $C_{DV}$ | $V_{DV}$ | Lower is good |
| | Road Type | $C_{RT}$ | $V_{RT}$ | Lower is good |
| | Density of signals | $C_{DS}$ | $V_{DS}$ | Lower is good |
| | Time | $C_{TI}$ | $V_{TI}$ | Lower is good |

At any given instant, the Driving Condition index (DC) may be determined with the above set of parameters based on a linear relationship:

$$DC = C_{GR}*V_{GR} + C_{CU}*V_{CU} + C_{SU}*V_{SU} + C_{HU}*V_{HU} + C_{TM}*V_{TM} + C_{WS}*V_{WS} + C_{VS}*V_{VS} + C_{DV}*V_{DV} + C_{RT}*V_{RT} + C_{DS}*V_{DS} + C_{TI}*V_{TI}$$

Similarly, with a larger set of parameters, DC can be determined as $\Sigma C_i*V_i$, where i ranges from 1 to N. N is the total number of parameter values $V_i$ used in the calculation, and $C_i$ is the coefficient of combination of each of the parameters. However, a more accurate DC can be determined using a non-linear relationship between the parameters, in which case, DC can be represented as $DC = F_n(V_i)$, wherein $F_n$ may be a polynomial of order N, e.g. $VC = \Sigma C_i*V_i^{\,}P_i$.

The method may include one or more of the following steps:

| Step | Title | Description |
|---|---|---|
| 1 | Obtain driving condition parameters information | OBMU 202 may obtain driving condition parameter information from sensors, other interfaces, and the EC 304. |
| 2 | Obtain coefficients | In case valid values of the coefficients are present in the ETMU 206 locally, these coefficient values may be used. Otherwise, the ETMU 206 may obtain coefficient values from the EC 304. |
| 3 | Estimate instantaneous value of Driving Condition index | ETMU 206 may estimate instantaneous value of Driving Condition index using the obtained parameters and combining them using the formula stated above. |

Module 5

Determining of Driving Pattern

Module 5 may obtain, before or at the beginning of a trip, initial driving pattern information from historical driver profile information through the ETMU 206. However, if the driver has no historical information, then the driving pattern may determined by the EC 304 based on a closest match in existing driver profile information (e.g., matching with similar profiles) or creating a new profile through analysis of similar driver profiles as part of driver assessment in the process of driver-registration with the vehicle-onboard system 102.

A Driving Pattern index may be calculated at a given moment and/or on a trip cumulative basis to represent the driving behavior of the driver for a specific vehicle under actual driving conditions over the course of a trip. This estimates a single index to represent driving pattern. For example, at any instant the condition of the vehicle can be determined using the one or more parameters such as accelerator operation, brake operation, clutch operation, engine idling, frequency of starts and stops, window control, HVAC usage, pressure of the one or more tires, vehicle loading, driving mode selection (e.g., EV, Diesel, Gas), etc. The table below summarizes exemplary parameters and their associated coefficients, parameter values, and preferred trend.

| Parameters | Coefficient | Parameter Values | Trend |
|---|---|---|---|
| Accelerator operation | $B_{ACC}$ | $V_{ACC}$ | Lower is good |
| Brake Operation | $B_{BO}$ | $V_{BO}$ | Lower is good |
| Gear Operation | $B_{GO}$ | $V_{GO}$ | Lower is good |
| Clutch Operation | $B_{CO}$ | $V_{CO}$ | Lower is good |
| Engine Idling | $B_{EI}$ | $V_{EI}$ | Lower is good |
| Frequency of start-stop | $B_{SS}$ | $V_{SS}$ | Lower is good |
| Air drag (window control) | $B_{AD}$ | $V_{AD}$ | Lower is good |
| Loading (goods) | $B_{LF}$ | $V_{LF}$ | Lower is good |
| HVAC | $B_{AC}$ | $V_{AC}$ | Lower is good |

At any given instant, the Driving Pattern index (DP) may be determined with the above set of parameters with a linear relationship as below:

$$DP = B_{ACC}*V_{ACC} + B_{BO}*V_{BO} + B_{GO}*V_{GO} + B_{CO}*V_{CO} + B_{EI}*V_{EI} + B_{SS}*V_{SS} + B_{AD}*V_{AD} + B_{LF}*V_{LF} + B_{AC}*V_{AC}$$

Similarly, with a larger set of parameters, DP can be determined as $\Sigma B_i*V_i$, where i ranges from 1 to N. N is the total number of parameter values $V_i$ used in the calculation, and $B_i$ is the coefficient of combination of each of the parameters. However, a more accurate DP can be determined using a non-linear relationship between the parameters, in which case, DP can be represented as $DP = F_n(V_i)$, wherein $F_n$ may be a polynomial of order N, e.g. $DP = \Sigma B_i*V_i^{\,}P_i$.

Module 6

Intelligent Aggregation for Analytics

The parameters determined by systems and methods of the present disclosure may be aggregated for further analysis. For example, eco-driving system 100 may trigger aggregation at the conclusion of a trip. The method may include one or more of the following:

| Step | Title | Description |
|---|---|---|
| 1 | Trigger for data aggregation | This can be triggered every trip. As another example, this can be based to multi-user aggregation on a daily basis. This can also be triggered by the EC 304 as a result of background/batch job for the preparation of common analysis data. |
| 2 | Data Aggregation | The data aggregation may be performed by the EDA 302. This may include aggregation of Driver EcoIndex, Vehicle EcoIndex, instantaneous EcoIndex values determined by the ETMU 206, Vehicle Condition index and underlying parameters, Driving Condition index and underlying parameters, etc. |
| 3 | Data Analysis | Data analysis may be performed by EAE 308. While the EDA 302 aggregates, comparative analysis is performed by the EAE 308 depending on the criteria provided by the EC 304. |

The aggregated parameters may include at least one of a trip profile or summary, a driver profile, a vehicle profile, a traffic profile, a weather profile, an emission profile, or one or more EcoIndex values (e.g. Driver EcoIndex, Vehicle EcoIndex, Trip EcoIndex).

Module 7

Reward Points Estimation

Reward points may be estimated based on the EcoIndex (e.g., the Driver EcoIndex, or Vehicle EcoIndex), which can be used for discounts during future purchases, servicing, and/or buying of spare parts, etc. For the driver, the index can be used to determine compensation, an award, discounts, etc. The reward points estimation may consider a vehicle profile (including, for example, a Vehicle Identification Number (VIN), make, model, type, and/or Vehicle EcoIndex), a driver profile, EcoIndex values (Driver EcoIndex, Vehicle EcoIndex, and/or the like), and industry standard information.

The method may include one or more of the following steps:

| Step | Title | Description |
|---|---|---|
| 1 | Obtain user input | ECDNRT 310 may obtain an input from the user on a vehicle-id (e.g. a VIN) or a driver identifier (e.g., an identity associated with the driver profile). |
| 2 | Reward Point estimation | EC 304 may obtain the input of the user from the ECDNRT 310 and necessary data from ECDB 306. Vehicle reward point estimation: The reward points may be estimated based on comparison of Vehicle EcoIndex values, using the relevant industry standard as a baseline (reference). Any interested stakeholder may provide VIN(s) for an individual vehicle or a fleet of vehicles through ECDNRT 310 interface to the EC 304. Driver reward point/incentive estimation: EAE 308 may analyze and provide reward point estimation based on comparison of Driver EcoIndex values. For example drivers may be ranked by their respective Driver EcoIndex values and certain percentiles, e.g. 90th percentile and above, may be granted reward points and/or incentives. |
| 3 | Display reward point index | The ECDNRT 310 may obtain reward point estimation corresponding to the user provided input and displays the estimated reward points. Alternatively an interested stakeholder(s) can also obtain the reward point estimation through other interfaces. |

Module 8

Estimation of Carbon Credit Points

Systems and methods in accordance with the present disclosure may provide a carbon credit points estimation based on the emission levels of one or more vehicles. The method may include one or more of the following steps:

| Step | Title | Description |
|---|---|---|
| 1 | Obtaining a vehicle identification code | Any interested owner of the vehicle or fleet of vehicles may provide VIN(s) for an individual vehicle or a fleet of vehicles through the ECDNRT 310. |
| 2 | Analysis of data for carbon credit point calculation | EC 304 may retrieve cumulative emission data for each of the specified vehicles from the ECDB 306 and may use the EAE 308 to perform necessary analysis to prepare data for carbon credit calculation. The EAE 308 may analyze emission data for each vehicle based on the available historical information, and calculates the cumulative emission values. The total emission in multiples of ton of carbon dioxide or the cumulative mass of greenhouse gases with a carbon dioxide equivalent (tCO2e) of one ton. The EAE 308 then compares these values against the emission standard information from the ECDB 306 and estimates carbon credit (or debit) points. |
| 3 | Providing Carbon credit information | The estimated credit and associated information may be provided through the external interface 312 or ECDNRT 310. |

Module 9

Estimation of Eco-Factor for Annual Maintenance Contract (AMC), Etc

An AMC vendor may wish to obtain eco-factor for a vehicle to determine the contract price and/or conditions. Systems and methods in accordance with the present disclosure may estimate the eco-factor by executing one or more of the following:

| Step | Title | Description |
|---|---|---|
| 1 | Obtain vehicle identification code from AMC vendor | An AMC vendor may provide a vehicle identification code (e.g. a vehicle identifier, VIN, etc.) to the ECDNRT 310. |
| 2 | Cumulative Vehicle EcoIndex | EAE 308 may obtain Vehicle EcoIndex data for the specified vehicle from the EC 304. |
| 3 | Cumulative Driver EcoIndex | EAE 308 may obtain Driver EcoIndex value(s) for driver(s) of the specified vehicle(s) from the EC 304. |
| 4 | Obtain driving time proportion | EAE 308 may obtain the propertion of cumulative driving time of a vehicle by different drivers over a period of time. |
| 5 | Estimate eco-factor for AMC | EAE 308 may obtain linear combination coefficients from the EC 304 and calculate eco-factor based on Vehicle EcoIndex and Driver EcoIndex value(s), and driving time proportion using a linear combination of the foregoing. |

Module 10

Support for Eco-Contouring

Eco-contouring may provide zone-wise emission information over a period of time in the form of an emission density map. Eco-contouring may also include route-wise emission information over a period of time.

The method for a zone eco-contour may include one or more of the following:

| Step | Title | Description |
|---|---|---|
| 1 | Obtain spatial information of the area | EC 304 may obtain spatial information from a third-party provider of map and spatial data via external interface 312 or from the ECDB 306. |

-continued

| Step | Title | Description |
|---|---|---|
| 2 | Obtain user selection of the target area | EC 304 may obtain a spatial boundary of the area selected by the user through the ECDNRT 310. |
| 3 | Obtain time range from user | EC 304 may obtain time range as specified by the user through the ECDNRT 310. |
| 4 | Obtain emission data for the target area for the specified time range | EC 304 may select relevant emission data from the ECDB 306 based on the obtained time range and obtained spatial boundary. EC 304 may transit this information to the EAE 308 |
| 5 | Display emission variation on the spatial map | EAE 308 analyzes selected emission data along with the specified time range data and spatial data and provides this to the ECDNRT 310 to overlay on the map. This can be both graphical and text data. The ECDNRT 310 then renders the emission data on the overlaid map. |

The method for route-contouring may include one or more of the following:

| Step | Title | Description |
|---|---|---|
| 1 | Obtain user selection of the target route | EC 304 may obtain a route as selected by the user through the ECDNRT 310. |
| 2 | Obtain time range from user | EC 304 may obtain a time range as specified by the user through the ECDNRT 310. |
| 3 | Obtain emission data for the target route for the specified time range | EC 304 selects relevant emission data and detailed route definition from the ECDB 206 based on the obtained time range and obtained route selection. EC 304 may transit this information to the EAE 308 |
| 4 | Display emission variation on the spatial map | EAE 308 analyzes selected emission data along with the specified time range data and route-segment-data and provides to ECDNRT 310 to overlay on the map. This can be both graphical and text data. The ECDNRT 310 then renders the emission data on the overlaid map. |

Module 11

Lowering Fleet Operating Cost

Systems and methods in accordance with the present disclosure may provide information to help vehicle fleet operators reduce their operating costs. The method may include one or more of the following:

| Step | Title | Description |
|---|---|---|
| 1 | Obtain fleet details | The EC 304 may obtain fleet information from the user through the ECDNRT 310. The EC 304 may obtain details about each vehicle of the fleet from the ECDB 206. |
| 2 | Obtain Driver information | The EC 304 may then obtain details of each driver and their driving history for different vehicles of the fleet. |
| 3 | Obtain route information | The EC 304 may then obtain details of each route and driving history for different vehicles on those routes. |
| 5 | Analyze for optimal matching | The EC 304 may then initiate detailed analysis of the obtained information using the EAE 308. The EAE 308 may analyze the driving behavior data, route data (along with the driving conditions) and fleet vehicle data along with the vehicle, driver and combined EcoIndex to come up with an optimal match between driver, vehicle and route allocations for future fleet operations in order to get minimum emissions. |
| 6 | Estimating the impact on Fleet Operating Cost | The EC 304 may then estimate the cost impact based on the above analysis and further analysis using the EAE 308 involving fleet operation schedule information for the entire fleet. The EC 304 may provide several such estimations based on variations in different factors along with the pros and cons and areas of improvement. |
| 7 | Provide report and recommendation to the user | The EC 304 may displays through ECDNRT 310 a list of estimated impacts on operating cost to the user along with the areas of improvement possibilities. |

Method of Enabling Eco-Driving

Figure 4:
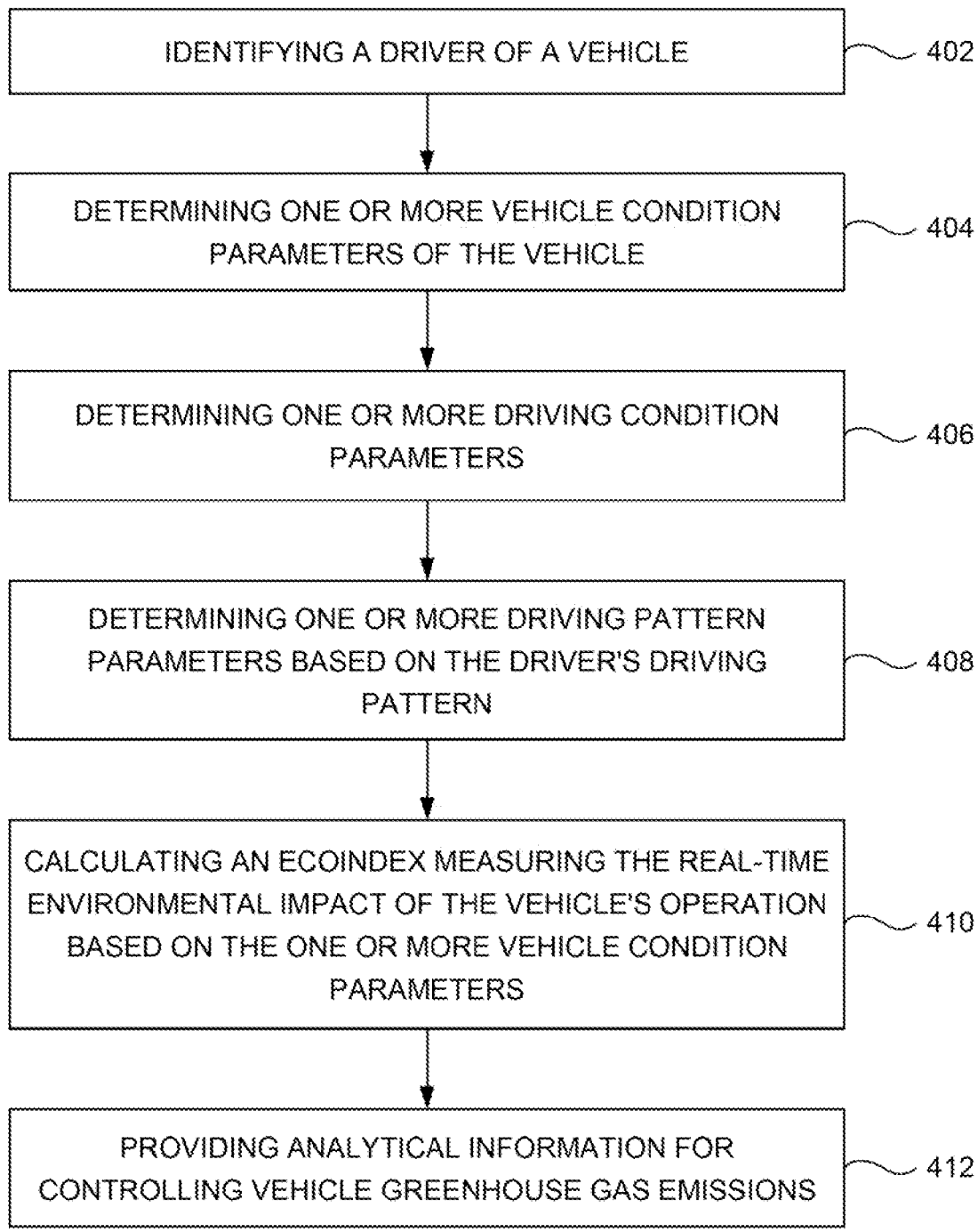
FIG. 4 is a flow diagram illustrating a method of enabling eco-driving using the eco-driving system of FIG. 1 according to an exemplary embodiment of the present disclosure.

FIG. 4 is a flow diagram illustrating an embodiment of a method of enabling eco-driving using the eco-driving system 100 of FIG. 1. In step 402, a driver of a vehicle is identified to authenticate the driver. The driver identification and authentication may be performed to identify the driver who is driving the vehicle in a trip. The ECDRT 204 may capture a driver identifier associated with the driver (e.g. a biometric identifier such as a fingerprint, a retinal scan, a name entry, and/or a user-ID entry, etc.). The ETMU 206 may then transmit the driver identifier to the EC 304. The EC 304 may then compare the driver identifier with an existing driver profile in the ECDB 306. In one embodiment, the EC 304 may compare the driver identifier with multiple existing driver profiles in the ECDB 306. In some embodiments, the driver may be identified by associating one or more driver identifiers with a driver profile, and may be authenticated based on the one or more driver identifiers and/or the driver profile. The EC 304 may communicate a notification message that indicates authentication success or failure to the ETMU 206 based on an outcome of the match. In some embodiments, the notification message may indicate successful authentication when the driver identifier matches at least one existing driver profile. When the driver identifier matches at least one existing driver profile, a brief profile of the driver may be displayed through the ECDRT 204. In another embodiment, the notification message may indicate failure when the driver identifier does not match at least one existing driver profile.

When the driver is identified and authenticated, the ECDRT 204 may provide an option to the driver to select a starting point and an end destination. Based on a choice of a user or the driver, the ETMU 206 may obtain at least one option for different low emission routes from the EC 304 and display it on the ECDRT 204. The user may then select at least one low emission route from the low-emission routes displayed through the ECDRT 204 using, for example, steps set forth in Module 3.

In step 404, one or more vehicle condition parameters of the vehicle are determined. The one or more vehicle condition parameters may include at least one of: total mileage, tire condition, fuel quality, emission level, brake system condition, clutch system condition, engine system condition, gear system condition, and/or exhaust system condition. In step 406, one or more driving condition parameters are determined. The one or more driving condition parameters may include at least one of: terrain parameters, weather parameters, and/or traffic parameters. In step 408, one or more driving pattern parameters are determined based on the driver's driving pattern. The one or more driving pattern parameters may include at least one of: accelerator operation, brake operation, gear operation, clutch operation, engine idling, frequency of start-stop, air drag, window control, HVAC usage, tire pressure, vehicle loading, and/or driving mode selection.

In step 410, an EcoIndex measuring the real-time environmental impact of the vehicle's operation is calculated based on the one or more vehicle condition parameters, the one or more driving condition parameters, and/or the one or more driving pattern parameters. The EcoIndex may be calculated based on a calculation of a vehicle condition index based on the vehicle condition parameters, a calculation of driving condition index based on the driving condition parameters, and a calculation of a driving pattern index based on the driving pattern parameters. In some embodiments, the EcoIndex may be calculated as a linear combination of the vehicle condition index, the driving condition index, and the driving pattern index. In other embodiments, the EcoIndex may be calculated as a non-linear polynomial function of the vehicle condition index, the driving condition index, and the driving pattern index.

In step 412, analytical information may be provided for controlling vehicle greenhouse gas emissions. The analytical information may include providing real-time information including at least one of: providing a low-emission route, providing real-time parameters, or providing a notification or alert to the driver. The real-time parameters may include at least one of: the vehicle condition parameters, the driving condition parameters, the driving pattern parameters, or the EcoIndex. In some embodiments, in-trip information may be displayed to the driver and/or to the user when the at least one low emission route is selected. When the vehicle starts moving, the ECDRT 204 may start displaying the real-time trip information. The real-time trip information may include details on driving behavior/pattern, vehicle conditions, external conditions, and/or EcoIndex (e.g. an instantaneous EcoIndex calculated by ETMU 206), etc. In some embodiments, the modules that are used in this method include Module 1, Module 4, and/or Module 5. Appropriate recommendations and/or notifications are delivered and/or displayed on the ECDRT 204 during the trip. For example, in case of an alert condition, or in case of a message to be conveyed to the driver in real-time, the ETMU 206 analyzes the condition and obtains appropriate message/content from the EC 304. When notifications are to be delivered/displayed to the driver, the ETMU 206 may obtain the content and provide it to the driver through the ECDRT 204. In the case of escalations and other stakeholder notifications (e.g., when the stakeholder is a fleet owner), the EC 304 may initiate communication of the content through the ECDNRT 310. The modules used in this method may include Module 5 and/or Module 6. The analytical information may include providing non-real-time information including at least one of: a summary of the vehicle's operation over the course of a trip, a reward points estimation, a carbon credits estimation, an EcoIndex for one or more specified vehicles, an emission density map, and a forecast of usage for one or more specified vehicles.

Individual and aggregated trip data may be transmitted to the ECS 106 to analyze the trip data when the trip ends. For example, when the vehicle is stopped (e.g., when the vehicle engine is turned off when the driver reaches the end destination), the ETMU 206 may determine individual and aggregated trip data for that particular trip from the EC 304 and provide a display on the ECDRT 204. In certain embodiments, information related to the trip, such as the one or more vehicle condition parameters, the one or more driving pattern parameters, the one or more driving condition parameters, and/or the EcoIndex, etc. is displayed. The modules involved in this method may include Module 4, Module 5, Module 6 and/or Module 7. Further intelligent aggregation and analysis may be initiated by the EC 304 using the Module 6. The trip data may be aggregated and analyzed (e.g., using the ecometer analytics engine 308) when the trip ends. Information related to driving patterns, vehicle conditions, and external conditions are obtained by the EAE 308 from the ECDB 306 through the EC 304. The EAE 308 may carry out various analyses to provide substantiated data for multiple scenarios. The modules involved in this method may include Module 6, Module 8, Module 9, Module 10, and Module 11.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, other embodiments of the invention will be apparent to those skilled in the art from consideration of the specification and practice of the invention claimed herein. It is intended that the specification and examples be considered as exemplary only, with a true scope and spirit of the invention being defined by the following claims.

What is claimed is:

1. A computer-implemented method for enabling eco-driving, comprising:

identifying, using at least one sensor, a driver of a vehicle;

associating, using at least one processor, a driver profile with the driver, wherein the driver profile include at least one of: driver identifiers, driving history, driving pattern, accidents involving the driver, insurance claims, traffic violations, vehicles driven, and greenhouse as emissions produced;

determining, using the at least one processor, one or more vehicle condition parameters of the vehicle, wherein the one or more vehicle condition parameters include at least one of: total mileage, tire condition, fuel quality, emission level, brake system condition, clutch system condition, engine system condition, gear system condition, and exhaust system condition;

determining, using the at least one processor, one or more driving condition parameters, wherein the one or more driving condition parameters include at least one of: one or more terrain parameters, one or more weather parameters, and one or more traffic parameters;

determining, using the at least one processor, one or more driving pattern parameters based on the driver's driving pattern, wherein the one or more driving pattern parameters include at least one of: accelerator operation, break operation, gear operation, clutch operation, engine idling, frequency of start-stop, air drag, window control, HVAC usage, tire pressure, vehicle loading, and driving mode selection;

calculating, using the at least one processor, an EcoIndex measuring the real-time environmental impact of the vehicle's operation based on the one or more vehicle condition parameters, the one or more driving condition parameters, and the one or more driving pattern parameters;

comparing the EcoIndex to a predetermined threshold; and
providing, via a user interface, analytical information for controlling vehicle greenhouse gas emissions including at least one alternative route that is calculated, based on the comparison of the EcoIndex to the predetermined threshold and the driver profile associated with the driver, to produce lower emissions.

2. The method according to claim 1, wherein calculating the EcoIndex comprises:
calculating a vehicle condition index based on the one or more vehicle condition parameters;
calculating a driving condition index based on the one or more driving condition parameters;
calculating a driving pattern index based on the one or more driving pattern parameters; and
calculating the EcoIndex based on the vehicle condition index, the driving condition index, and the driving pattern index.

3. The method according to claim 2, wherein the EcoIndex is calculated as a linear combination of the vehicle condition index, the driving condition index, and the driving pattern index.

4. The method according to claim 2, wherein the EcoIndex is calculated as a non-linear polynomial function of the vehicle condition index, the driving condition index, and the driving pattern index.

5. The method according to claim 1, wherein identifying the driver comprises:
determining one or more driver identifiers, wherein the one or more driver identifiers include at least one of: a user ID, a password, a finger print, and a retinal scan; and
authenticating the driver based on the one or more driver identifiers.

6. The method according to claim 1, wherein providing analytical information comprises providing real-time information including at least one of:
providing one or more real-time parameters, wherein the one or more real-time parameters include at least one of: one or more vehicle condition parameters, one or more driving condition parameters; one or more driving pattern parameters, or the EcoIndex; or
providing a notification or alert to the driver.

7. The method according to claim 1, wherein providing analytical information comprises providing non-real-time information including at least one of:
a reward points estimation; and
a carbon credits estimation.

8. The method according to claim 1, further comprising:
identifying all possible routes to a destination;
determining emissions estimates for each of the possible routes using information from third party sources;
determining a current route; and
identifying at least one alternative route from the possible routes that is calculated to produce lower emissions than the current route.

9. The method according to claim 1, wherein providing analytical information further comprises providing non-real-time information including at least one of:
a summary of the vehicle's operation over the course of a trip;
an EcoIndex for one or more specified vehicles;
an emission density map; and
a forecast of usage for one or more specified vehicles.

* * * * *